(12) United States Patent
Aggarwal et al.

(10) Patent No.: US 7,865,456 B2
(45) Date of Patent: *Jan. 4, 2011

(54) METHODS AND APPARATUS FOR OUTLIER DETECTION FOR HIGH DIMENSIONAL DATA SETS

(75) Inventors: Charu C. Aggarwal, Mohegan Lake, NY (US); Philip Shi-Lung Yu, Chicago, IL (US)

(73) Assignee: Trend Micro Incorporated, Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 12/134,371

(22) Filed: Jun. 6, 2008

(65) Prior Publication Data

US 2008/0234977 A1 Sep. 25, 2008

Related U.S. Application Data

(63) Continuation of application No. 09/686,115, filed on Oct. 11, 2000, now Pat. No. 7,395,250.

(51) Int. Cl.
G06N 5/00 (2006.01)

(52) U.S. Cl. ....................................................... 706/45
(58) Field of Classification Search .................. 706/45
See application file for complete search history.

(56) References Cited

U.S. PATENT DOCUMENTS 7,395,250 B1 * 7/2008 Aggarwal et al. ............. 706/20

OTHER PUBLICATIONS

Y. Zhang, et al., A Taxonomy Framework for Unsupervised Outlier Detection Techniques for Multi-Type Data Sets. Technical Report TR-CTIT-07-79, Enschede, Nov. 2007.*

C.C. Aggarwal et al., "Finding Generalized Projected Clusters in High Dimensional Spaces," Proceedings of the ACM SIGMOD Conference, pp. 1-12, 2000.

M.M. Breunig et al., "LOF: Identifying Density-Based Local Outliers," Proc. ACM SIGMOD 2000 Int. Conf. on Mangement of Data, Dallas, TX, pp. 1-12, 2000.

S. Ramaswamy et al., "Efficient Algorithms For Mining Outliers From Large Data Sets," Proceedings of the ACM SIGMOD Conference, pp. 1-20, 2000.

C.C. Aggarwal et al., "Fast Algorithms for Projected Clustering," Proceedings of the ACM SIGMOD Conference, pp. 1-12. 1999.

K. Beyer et al., "When Is 'Nearest Neighbor' Meaningful?," Proceedings of the ICDT, pp. 1-19, 1999.

E.M. Knorr et al., "Finding Intensional Knowledge of Distance-Based Outliers," Proceedings of the 25th VLDB Conference, Edinburgh, Scotland, pp. 211-222, 1999.

E.M. Knorr et al., "Algorithms For Mining Distance-Based Outliers in Large Datasets," Proceedings of the 24th VLDB Conference, New York, USA, pp. 392-403, 1998.

A. Arning et al., "A Linear Method for Deviation Detection in Large Databases," Proceedings of the KDD Conference, pp. 1-6, 1995.

S. Sarawagi et al., "Discovery-Driven Exploration of OLAP Data Cubes," IBM Almaden Research Center, San José, CA, pp. 1-15.

* cited by examiner

*Primary Examiner*—Wilbert L Starks, Jr.
(74) *Attorney, Agent, or Firm*—Okamoto & Benedicto LLP

(57) ABSTRACT

Methods and apparatus are provided for outlier detection in databases by determining sparse low dimensional projections. These sparse projections are used for the purpose of determining which points are outliers. The methodologies of the invention are very relevant in providing a novel definition of exceptions or outliers for the high dimensional domain of data.

30 Claims, 7 Drawing Sheets

FIG. 1
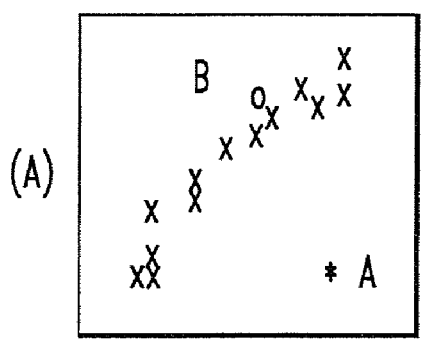
VIEW 1
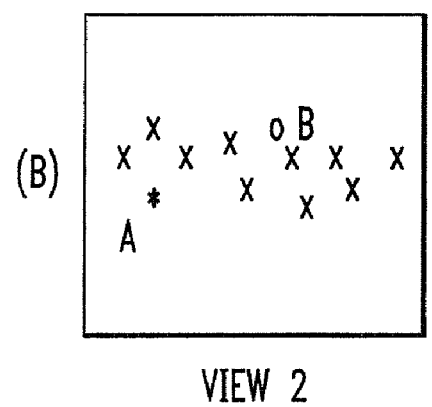
VIEW 2
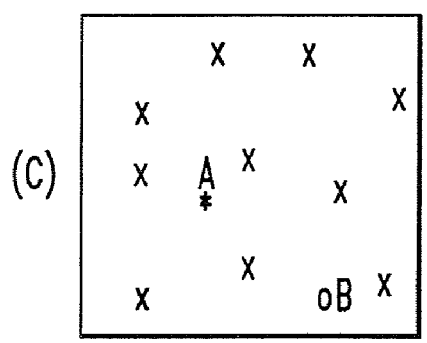
VIEW 3
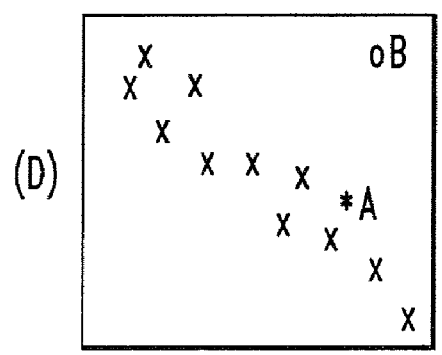
VIEW 4

METHODS AND APPARATUS FOR OUTLIER DETECTION FOR HIGH DIMENSIONAL DATA SETS

CROSS REFERENCE TO RELATED APPLICATIONS

The present application is a continuation of U.S. patent application Ser. No. 09/686,115, filed on Oct. 11, 2000, the disclosure of which is incorporated by reference herein.

FIELD OF THE INVENTION

The present invention is related to outlier detection in high dimensional data and, more particularly, to methods and apparatus for performing such detection in accordance with various high dimensional data domain applications where it is important to be able to find and detect outliers which deviate considerably from the rest of the data.

BACKGROUND OF THE INVENTION

The outlier detection problem is an important one for very high dimensional data sets. Much of the recent work has focused on finding outliers for high dimensional data sets which are based on relatively low dimensionalities, for example, up to 10 or 20. However, the typical applications in which points are outliers may involve higher dimensionality such as, for example, 100 or 200. For such applications, more effective techniques are required for outlier detection.

Many data mining algorithms described in the literature find outliers as an aside-product of clustering algorithms. Such techniques typically find outliers based on their nuisance value rather than using techniques which are focused towards detecting deviations, see, e.g., A. Arning et al., "A Linear Method for Deviation Detection in Large Databases," Proceedings of the KDD Conference, 1995. Outliers are however quite useful based on their value for finding behavior which deviates significantly from the norm. In this invention, we carefully distinguish between the two, and develop algorithms which generate only outliers which are based on their deviation value.

Although the outlier detection definition described in S. Ramaswamy et al., "Efficient Algorithms for Mining Outliers from Large Data Sets," Proceedings of the ACM SIGMOD Conference, 2000 has some advantages over that provided in E. Knorr et al., "Algorithms for Mining Distance-based Outliers in Large Data Sets," Proceedings of the VLDB Conference, September 1998, both of them suffer from the same inherent disadvantages of treating the entire data in a uniform way. However, different localities of the data may contain clusters of varying density. Consequently, a new technique which finds outliers based on their local density was proposed in M. M. Breunig et al., "LOF: Identifying Density-Based Local Outliers," Proceedings of the ACM SIGMOD Conference, 2000, which finds the outliers based on their local neighborhoods; particularly with respect to the densities of these neighborhoods. This technique has some advantages in accounting for local levels of skews and abnormalities in data collections. In order to compute the outlier factor of a point, the method in the M. M. Breunig et al. reference computes the local reachability density of a point o by using the average smoothed distances to a certain number of points in the locality of o.

Thus, the above-mentioned techniques proposed in the above-cited E. Norr et al. reference, the S. Ramaswamy et al. reference and the M. M. Breunig et al. reference try to define outliers based on the distances in full dimensional space in one way or another. Recent results have also shown that when the distances between pairs of points are measured in the full dimensional space, all pairs of points are almost equidistant, see, e.g., K. Beyer et al., "When is Nearest Neighbors Meaningful?" Proceedings of the ICDT, 1999. In such cases, it becomes difficult to use these measures effectively, since it is no longer clear whether or not these are meaningful. In the context of the algorithms proposed in the above-cited E. Knorr et al. reference, a very small variation in d can result in either all points being considered outliers or no point being considered an outlier. The definition in the S. Ramaswamy et al. reference is slightly more stable since it does not rely on the use of such a parameter which is difficult to pick a priori. However, for high dimensional problems, the meaningfulness of the k-nearest neighbor in high dimensional space is in itself in doubt; therefore, the quality of outliers picked by such a method may be difficult to estimate. The same problem is relevant for the method discussed in the M. M. Breunig et al. reference in a more subtle way; since the local densities are defined using full dimensional distance measures.

For problems such as clustering, it has been shown (e.g., in C. C. Aggarwal et al., "Fast Algorithms for Projected Clustering," Proceedings of the ACM SIGMOD Conference, 1999 and C. C. Aggarwal et al., "Finding Generalized Projected Clusters in High Dimensional Spaces," Proceedings of the ACM SIGMOD Conference, 2000) that by examining the behavior of the data in subspaces, it is possible to design more meaningful clusters which are specific to the particular subspace in question. This is because different localities of the data are dense with respect to different subsets of attributes. By defining clusters which are specific to particular projections of the data, it is possible to design more effective techniques for finding clusters. The same insight is true for outliers, because in typical applications such as credit card fraud, only the subset of the attributes which are actually affected by the abnormality of the activity are likely to be applicable in detecting the behavior.

In order to more fully explain this point, let us consider the example illustrated in FIGS. 1A-1D. In the example, we have shown several 2-dimensional cross-sections of a very high dimensional data set. It is quite likely that for high dimensional data, many of the cross-sections may be structured; whereas others may be more noisy. For example, the points A and B show abnormal behavior in views 1 (FIG. 1A) and 4 (FIG. 1D) of the data. In other views, i.e., views 2 (FIG. 1B) and 3 (FIG. 1C), the points show average behavior. In the context of a credit card fraud application, both the points A and B may correspond to different kinds of fraudulent behavior, yet may show average behavior when distances are measured in all the dimensions. Thus, by using full dimensional distance measures, it would be more difficult to detect points which are outliers, because of the averaging behavior of the noisy and irrelevant dimensions. Furthermore, it is impossible to prune off specific features a priori, since different points (such as A and B) may show different kinds of abnormal patterns, each of which use different features or views.

Thus, the problem of outlier detection becomes increasingly difficult for very high dimensional data sets, just as any of the other problems in the literature such as clustering, indexing, classification, or similarity search. Previous work on outlier detection has not focused on the high dimensionality aspect of outlier detection, and has used methods which are more applicable for low dimensional problems by using relatively straightforward proximity measures, e.g., the above-mentioned E. Knorr et al. and S. Ramaswamy et al. references. This is very important for practical data mining applications which are mostly likely to arise in the context of very large numbers of features. The present invention focuses for the first time on the effects of high dimensionality on the problem of outlier detection. Recent work has discussed some of the concepts of defining the intentional knowledge which characterizes distance-based outliers in terms of subsets of attributes. Unfortunately, this technique was not intended for high dimensional data, and the complexity increases exponentially with dimensionality. As the results in E. Knorr et al., "Finding Intentional Knowledge of Distance-based Outliers," Proceedings of the VLDB Conference, September, 1999 show, even for relatively small dimensionalities of 8 to 10, the technique is highly computationally intensive. For even slightly higher dimensionalities, the technique is likely to be infeasible from a computational standpoint.

SUMMARY OF THE INVENTION

The present invention provides methods and apparatus for outlier detection which find outliers by observing the density distributions of projections from the data. Intuitively, this new definition considers a point to be an outlier, if in some lower dimensional projection, it is present in a local region of abnormally low density. Specifically, the invention defines outliers for data by looking at those projections of the data which have abnormally low density.

Accordingly, in an illustrative aspect of the invention, a method of detecting one or more outliers in a data set comprises the following steps. First, one or more sets of dimensions and corresponding ranges (e.g., patterns) in the data set which are sparse in density (e.g., have an abnormally low presence which cannot be justified by randomness) are determined. Then, one or more data points (e.g., records) in the data set which contain these sets of dimensions and corresponding ranges are determined, the one or more data points being identified as the one or more outliers in the data set.

In further illustrative aspects of the invention, the range may be defined as a set of contiguous values on a given dimension. The sets of dimensions and corresponding ranges in which the data is sparse in density may be quantified by a sparsity coefficient measure. The sparsity coefficient measure S(D) may be defined as $$\frac{n(D) - N * f^k}{\sqrt{N * f^k * (1 - f^k)}},$$

where k represents the number of dimensions in the data set, f represents the fraction of data points in each range, N is the total number of data points in the data set, and n(D) is the number of data points in a set of dimensions D. A given sparsity coefficient measure is preferably inversely proportional to the number of data points in a given set of dimensions and corresponding ranges. A set of dimensions may be determined using an algorithm which uses the processes of solution recombination, selection and mutation over a population of multiple solutions. The process of solution recombination may comprise combining characteristics of two solutions in order to create two new solutions. The process of mutation may comprise changing a particular characteristic of a solution in order to result in a new solution. The process of selection may comprise biasing the population in order to favor solutions which are more optimum.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 1A-1D are diagrams of various patterns of data sets illustrating outlier detection issues;

DETAILED DESCRIPTION OF PREFERRED EMBODIMENTS

Figure 2:
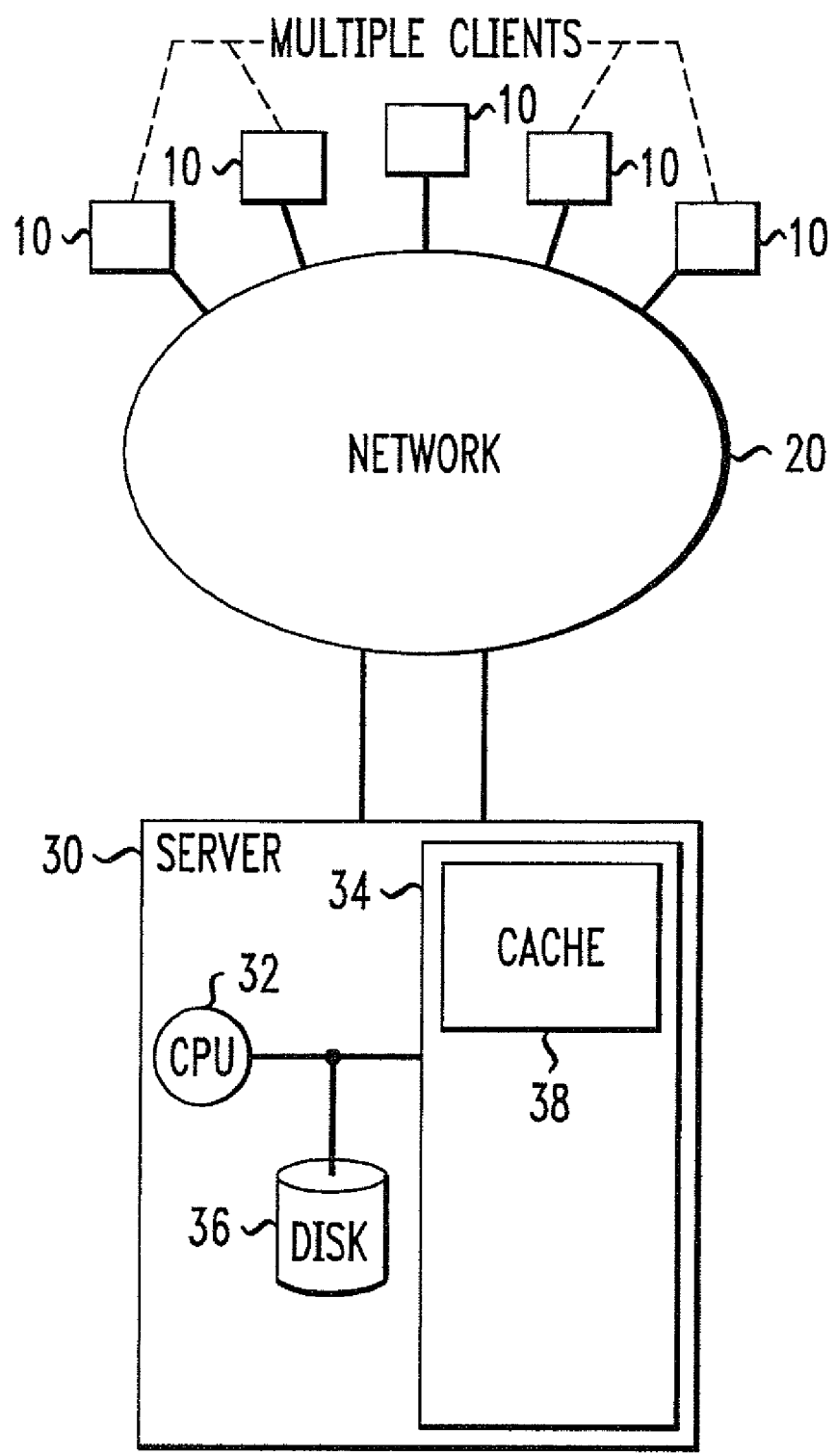
FIG. 2 is a block diagram illustrating a hardware implementation suitable for employing outlier detection methodologies according to an embodiment of the present invention.

As mentioned above, the present invention provides a new technique for outlier detection which finds outliers by observing the density distributions of projections from the data. Intuitively, this new definition considers a point to be an outlier, if in some lower dimensional projection, it is present in a local region of abnormally low density.

Specifically, the invention defines outliers for data by looking at those projections of the data which have abnormally low density. Thus, a first step is to identify and mine those patterns which have abnormally low presence which cannot be justified by randomness. Once such patterns have been identified, then the outliers are defined as those records which have such abnormal patterns present in them.

In order to find such abnormal lower dimensional projections, we need to define and characterize what we mean by an abnormal lower dimensional projection. An abnormal lower dimensional projection is one in which the density of the data is exceptionally lower than average. In order to find such projections, we first perform a grid discretization of the data. Each attribute of the data is divided into p ranges. These ranges are created on an equi-depth basis; thus each range contains a fraction f=1/p of the records. These ranges form the units of locality which we will use in order to define low dimensional projections which have unreasonably sparse regions.

Let us consider a k-dimensional region. The expected fraction of the records in that region, if the attributes were statistically independent, would be equal to $f^k$. Of course, the data is far from statistically independent; it is precisely the deviations which are abnormally below the norm which are useful for the purpose of outlier detection.

Let us assume that there are a total of N points in the database. Then, the expected fraction and standard deviation of the points in a k-dimensional cube is given by $N*f^k$ and a standard deviation of $\sqrt{N*f^k*(1-f^k)}$. Let n(D) be the number of points in a k-dimensional cube D. Then, we calculate the sparsity coefficient S(D) of the cube D as follows:

$$S(D) = \frac{n(D) - N*f^k}{\sqrt{N*f^k*(1-f^k)}}$$

Only sparsity coefficients which are negative indicate cubes which have lower presence than expected. Thus, it is desirable to find those projections which have low (or highly negative) sparsity coefficients.

Now we will discuss the algorithms which are useful for outlier detection in high dimensional problems. A natural class of methods for outlier detection are the naive brute-force techniques in which all subsets of dimensions are examined for possible patterns which are sparse. These patterns are then used in order to determine the points which are possibly outliers. We propose a naive brute-force algorithm which is very slow at finding the best patterns because of its exhaustive search of the entire space, and a much faster algorithm which is able to quickly prune away large parts of the search space.

The problem of finding subsets of dimensions which are sparsely populated is a difficult one, since one needs to look at an exponential number of combinations of attributes in order to find outliers. Furthermore, it may often be the case that even though particular regions may be well populated on certain sets of dimensions, they may be very sparsely populated when such dimensions are combined together. For example, there may be a large number of people below the age of 20, and a large number of people with diabetes; but very few with both. Consequently, it becomes difficult to prune the search space using structured search methods. Consequently, we borrow techniques from the class of genetic algorithms in order to design effective techniques for high dimensional outlier detection. For this purpose, we carefully design the various genetic algorithm components by effectively designing the data encoding, crossover and mutation techniques which are structurally suited to the outlier detection problem.

The idea of using the principles of organic evolution for solving combinatorial optimization problems was introduced by John Holland about thirty years ago. This idea was subsequently formalized by him in 1975 as Genetic Algorithms (D. E. Goldberg, "Genetic algorithms in search, optimization and machine learning," Addison Wesley, Reading, Mass., 1989). In his seminal work, Holland laid down the theoretical foundations of the area, and paved the way for all subsequent Genetic Algorithm research. In the past decade, the field of Genetic Algorithms has seen rapid progress both in terms of theoretical as well as applied work.

Figure 8:
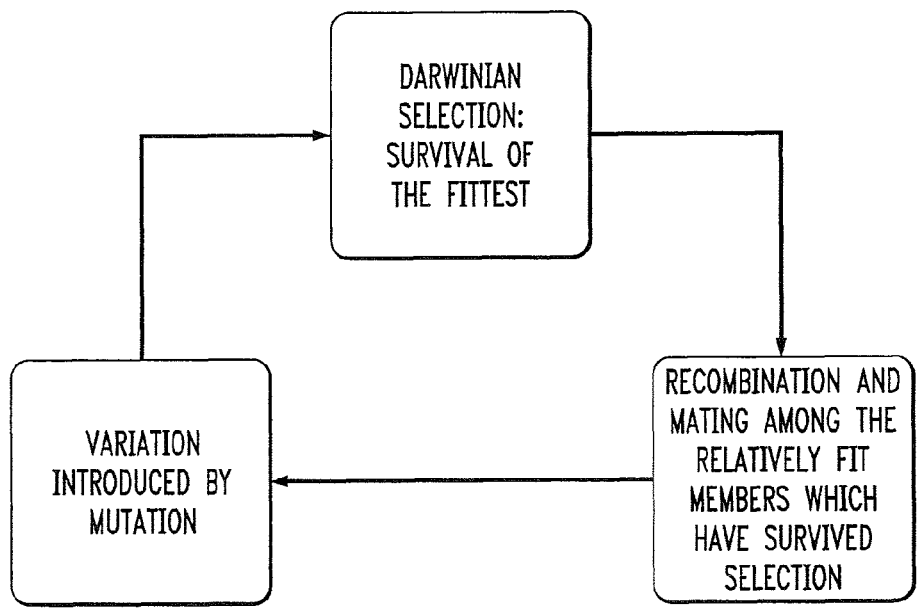
FIG. 8 is a diagram illustrating a broad outline of how the multi-population hill climbing, recombination and search space exploration works.

Genetic Algorithms are methods which imitate the process of organic evolution in order to solve parameter optimization problems. The principles of organic evolution were laid down by Charles Darwin several decades ago. The fundamental idea underlying the Darwinian view of evolution is that, in nature, resources are scarce and this automatically leads to a competition among the various species. As a result, all the species undergo a selection mechanism, in which only the fittest survive. Consequently, the fitter individuals tend to mate with each other more often, resulting in still better individuals. At the same time, once in a while, nature also throws in a variant by the process of mutation, so as to ensure a sufficient amount of diversity among the species, and hence also a greater scope for improvement. The basic idea behind Genetic Algorithms is also similar; every solution to an optimization problem can be "disguised" as an individual in an evolutionary system. The measure of fitness of this "individual" is simply equal to the objective function value of the corresponding solution, and the other species which this individual has to compete with are simply a group of other solutions to the problems. This is one of the reasons why Genetic Algorithms are more effective as heuristic search methods than either hill-climbing, random search or simulated annealing techniques; they use the essence of the techniques of all these methods in conjunction with recombination of multiple solutions in a population. Genetic Algorithms work not with one solution, but with a whole set of them at a time. Appropriate operations are defined in order to imitate the recombination and mutation processes as well, and the simulation is complete. A broad outline of how the multi-population hill climbing, recombination and search space exploration actually works is illustrated in FIG. 8.

Genetic Algorithms have become increasingly important in the past few years as compared to traditional optimization methods. This is primarily because there are large classes of optimization problems for which no efficient algorithms have been developed. Such problems may have an exponential search space, and the distance function may be very noisy and multi-modal, which results in a parameter optimization problem that is treacherously difficult to solve. Many of these problems arise in actual practical situations and require only specifications of approximately optimal solutions rather than provably optimal ones. In such situations, Genetic Algorithms certainly provide an empirically efficient method and perform much better than other traditional approaches such as hill climbing methods.

One of the interesting aspects of Genetic Algorithms is that for every problem the basic Genetic Algorithm used is the same. The only aspect in which the Genetic Algorithm for two problems differ is in the method by which feasible solutions to the combinatorial problem are disguised (or coded) as individuals in the population. Thus, in some sense, the complexity of any problem is captured in the concise problem of representing every solution as an individual in the population in such a way that encourages biological evolution.

Whenever the Genetic Algorithm is used to solve a particular problem, each feasible solution to that problem is defined as an individual. This feasible solution is in the form of a string and is the genetic representation of the individual. Such a string is referred to as a chromosome. In this invention, we will consistently refer to it as a string. Thus, in order to give a genetic representation to our individual, we must have a procedure which converts feasible solutions of the problem into strings which the Genetic Algorithm (hereinafter GA) can recognize and work with. This process of conversion is called coding. For example, in our invention, the string representation of an individual contains the set of dimensions in the record which are included in the projection. The measure of fitness of an individual is evaluated by the fitness function, which has as its argument the string representation of the individual and returns a non-negative real number indicating the fitness value. The fitness value of an individual is analogous to the objective function value; the better the objective function value, the larger the fitness value. Thus, GAs are naturally defined as maximization problems over non-negative objective function values. However, minimization problems can be easily converted into maximization problems on the Genetic Algorithm by simple fitness function transformations.

As the process of evolution progresses, all the individuals in the population tend to genetically become more and more similar to each other. This phenomenon is referred to as convergence. A different method is to terminate the algorithm after a pre-specified number of generations.

We now discuss a genetic algorithm for outlier detection which is able to find outliers by searching for subsets of dimensions in which the data is populated very sparsely. Genetic Algorithmic Techniques, as described in D. E. Goldberg, "Genetic algorithms in search, optimization and machine learning," Addison Wesley, Reading, Mass., 1989, are heuristic search methods which rely on successive solution recombinations, random explorations, and selections in order to gradually evolve the most optimum characteristics of a given solution. Problems which are inherently either computationally intensive because of an exponential search space or non-linear/unstructured with respect to the optimization function are good candidates. However, the exact quality of performance of a genetic algorithm is often dependent on how well it is tailored to a given problems. Typically, genetic algorithms which are customized for given problems in terms of the methods for solution recombination and random explorations perform significantly better than using black-box Genetic Algorithm software on straightforward string encodings, see, e.g., C. C. Aggarwal et al., "Optimized Crossover for the Independent set problem," Operations Research, March 1997. In accordance with the present invention, we provide a genetic algorithm which works effectively for the outlier detection problem.

We now discuss the application of the search technique to the outlier detection problem. Let us assume that the grid range for the $i^{th}$ dimension is denoted by t(i). Then, the value of t(i) can take on any of the values 1 through p, or it can take on the value *, which denotes a "don't care." Thus, there are a total of p+1 values that the dimension t(i) can take on. Thus, consider a 4-dimensional problem with p=10. Then, one possible example of a solution to the problem is given by *3*9. In this case, the ranges for the second and fourth dimension are identified, whereas the first and third are left as "don't cares." The fitness for the corresponding solution may be computed using the sparsity coefficient provided above.

The genetic algorithm has three main processes; those of selection, crossover and mutation which are performed repeatedly in order to find the interesting projections in which the outliers exist. We will now discuss the details of these operations in the remainder of detailed description of preferred embodiments below.

The following portion of the detailed description will illustrate the invention using an exemplary data processing system architecture. It should be understood, however, that the invention is not limited to use with any particular system architecture or application. The invention is instead more generally applicable to any data processing system or application in which it is desirable to perform more meaningful outlier detection by observing the density distributions of projections from the data.

FIG. 2 is a block diagram illustrating a hardware implementation suitable for employing outlier detection methodologies according to an embodiment of the present invention. As illustrated, an exemplary system comprises client devices 10 coupled, via a large network 20, to a server 30. The server 30 may comprise a central processing unit (CPU) 32, coupled to a main memory 34 and a disk 36. The main memory 34 may also comprise a cache 38 in order to speed up calculations. It is assumed that multiple clients 10 can interact with the server 30 over the large network 20. It is to be appreciated that the network 20 may be a public information network such as, for example, the Internet or world wide web, however, the clients and server may alternatively be connected via a private network, a local area network, or some other suitable network.

It is assumed that the server 30 contains a large repository of data which is used for the purpose of data mining. The requests for finding the outliers along with the corresponding data sets are specified at the client end 10. These requests are then responded to using the methodologies of the present invention as implemented on the server end 30. The computation is performed by the CPU 32. The data on which the analysis is carried out may already be available at the server on its disk 36, or it may be specified by the client. In either case, the computation is performed at the server end, and the results are returned to and presented to (e.g., displayed) the client.

In one preferred embodiment, software components including instructions or code for performing the methodologies of the invention, as described herein, may be stored in one or more memory devices described above with respect to the server and, when ready to be utilized, loaded in part or in whole and executed by the CPU.

Figure 3:
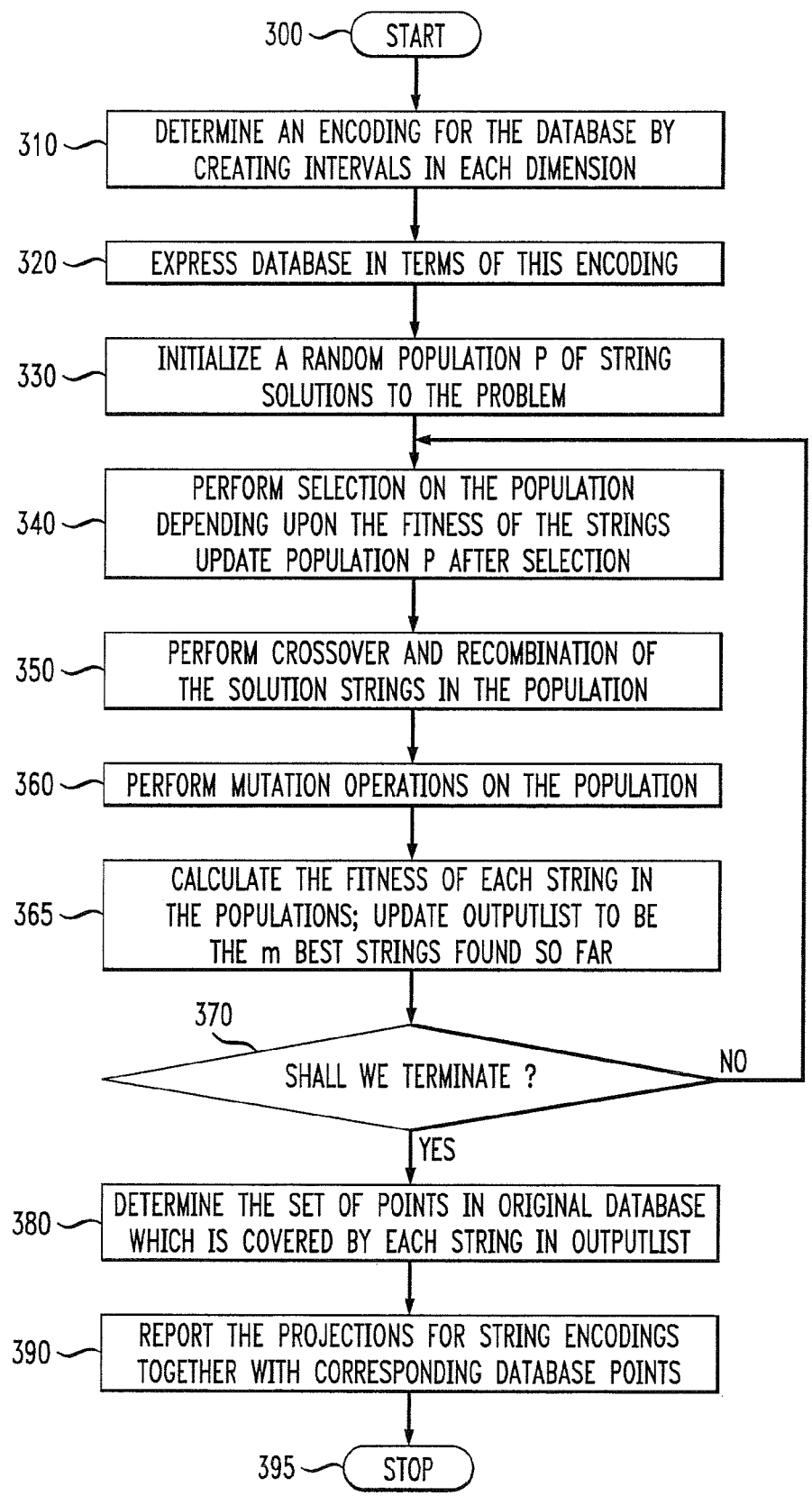
FIG. 3 is a flow diagram illustrating an overall process for outlier detection according to an embodiment of the present invention.

FIG. 3 is a flow diagram illustrating an overall process for outlier detection according to an embodiment of the present invention. Specifically, the flow diagram of FIG. 3 describes the steps of first encoding the transactions as strings, and then running the iterative genetic algorithm process on the strings in order to find the appropriate outlier projections. These projections along with the corresponding outlier points are returned by the algorithm. The inputs to the process include the projection dimensionality, the set of database points and the number of patterns m. The process starts at block 300. In step 310, an encoding is determined for the database by creating the intervals for each dimension. For example, let us consider a 2-dimensional database in which there are two attributes, age and salary. Then, the encoding will be created by a string of length 2. Let us say that each of the two attributes is divided into p=3 ranges. For example:

Age:
  Range 1→0-30
  Range 2→31-60
  Range 3→61 and above

Salary:
  Range 1→0-50,000
  Range 2→50,001-100,000
  Range 3→100,001 and above

Then, a 28-year-old person with a salary of 60,000 would been encoded as 12 (i.e., Age Range 1 followed by Salary Range 2), whereas a 62-year-old person with a salary of 20,000 would be encoded as 31. Also, in step 310, we first divide each of the attributes of the database into intervals. Each of these intervals is chosen in such a way that an equal number of records satisfy them. Thus, if p intervals are chosen, then exactly a fraction 1/p of the records in the database lie in each of these intervals. In step 320, each record in the database is expressed in terms of these intervals.

In the next set of steps (330-370), an attempt is made to discover those subpatterns of these string representations of the database which are very sparsely represented in the database by using a genetic algorithm-based technique. At this stage, we mention how the genetic algorithm representation technique represents a "don't care"-*. Thus, for a d-dimensional database, if we want to find k-dimensional projections which are sparse, then exactly (d-k) entries of the string would be *, whereas other entries would be a number between 1 through p. For example, in the 2-dimensional example enumerated above, the string 2* refers to any individual whose age-range is in 31-60, but the salary could be in any range. This is an example of a 1-dimensional projection of a 2-dimensional problem.

In step 330, a random population P of string solutions to the problem is initialized. Each member of this population is defined by first randomly picking (d-k) positions and setting them to *. The remaining k positions are set to any number between 1 and p. Once the population has been initialized, we run the three operators of selection, mutation and crossover on the strings. The process of selection is performed in step 340, in which those strings which represent more sparse patterns are given greater representation. A detailed description of this process is provided in FIG. 5. In step 350, we perform crossover and recombination of the solution strings in the population. A detailed description of this process is provided in FIG. 6. In step 360, we perform the mutation operation. A detailed description of this process is provided in FIG. 7.

In step 365, the fitness of each string in the population is calculated. Note that the fitness of a string is determined by the number of records in the database that the string covers. The smaller the number of records it covers, the fitter the string, since it is more likely to be a sparsely populated projection. An output list is then the m best strings found so far. In step 370, it is tested whether the process should be terminated at that point. In order to perform the test, several criteria are possible. One of the criteria is whether the looping steps embodied by blocks 340, 350, and 360 have been executed more than a certain number of times. If not, the process returns to step 340. If yes, in step 380, the set of points in the database which are covered by any of the strings on the output list is found. A point in the database is covered by a string if that point lies in the database projection which is determined by that string. For the 2-dimensional example illustrated above, the database point 21 is covered by the string 2*.

In step 390, the sparsely populated projections for the string encodings together with the corresponding database points are reported. The process stops at block 395.

Figure 4:
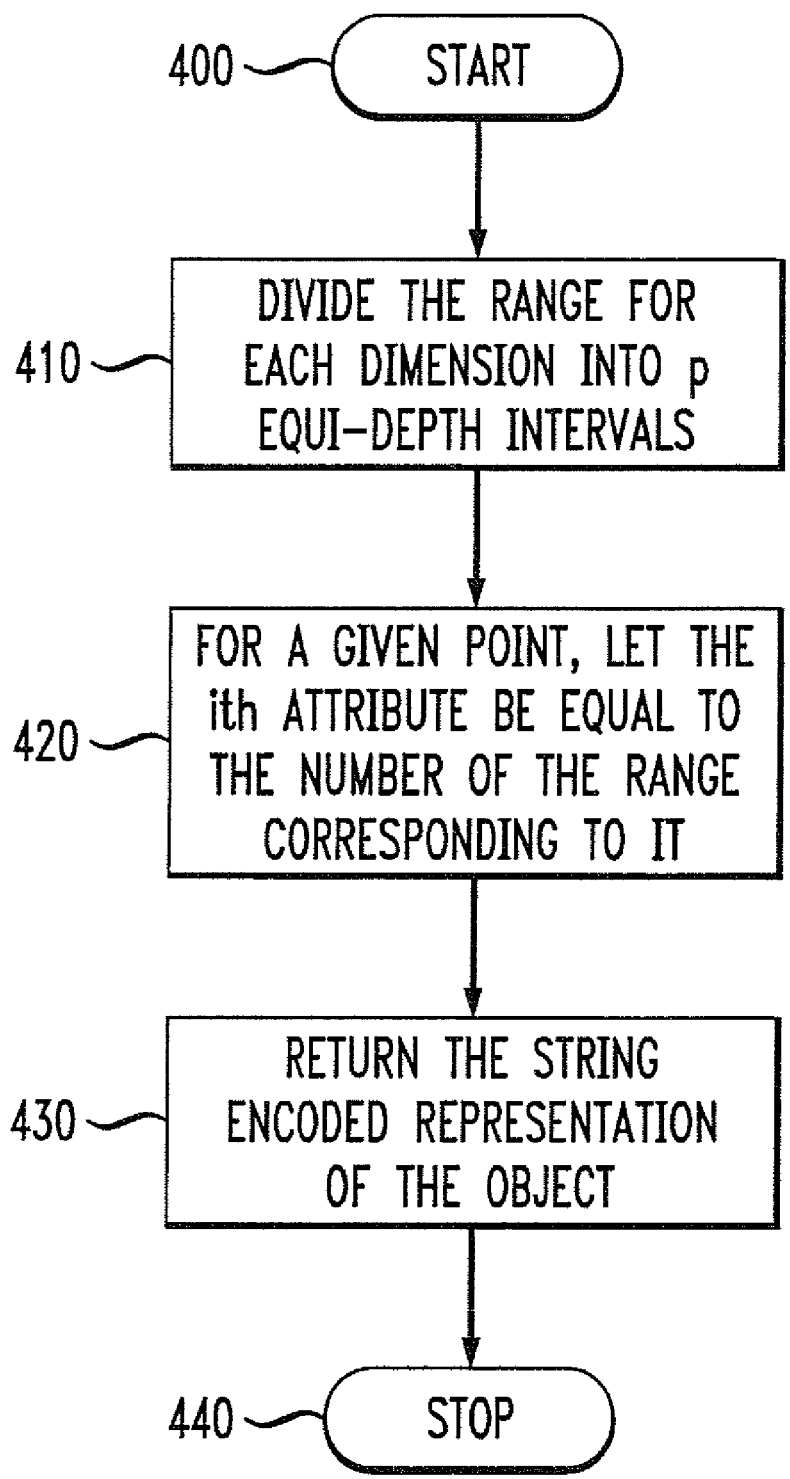
FIG. 4 is a flow diagram illustrating a procedure for encoding potential solutions as strings according to an embodiment of the present invention.

In FIG. 4, we illustrate a process for determining the encoding for each of the records in the database according to an embodiment of the invention. This process is required in order to implement step 320 of FIG. 3. The process starts at block 400. In step 410, the range for each dimension is divided into p equi-depth intervals. Note that in equi-depth intervals, each member of the population is covered by an equal number of records. In step 420, the range corresponding to the $i^{th}$ attribute is found. Thus, for a given point, the $i^{th}$ attribute is made equal to the number of the range corresponding to it. In step 430, the string encoded representation of the object is then returned. The process stops at block 440.

Figure 5:
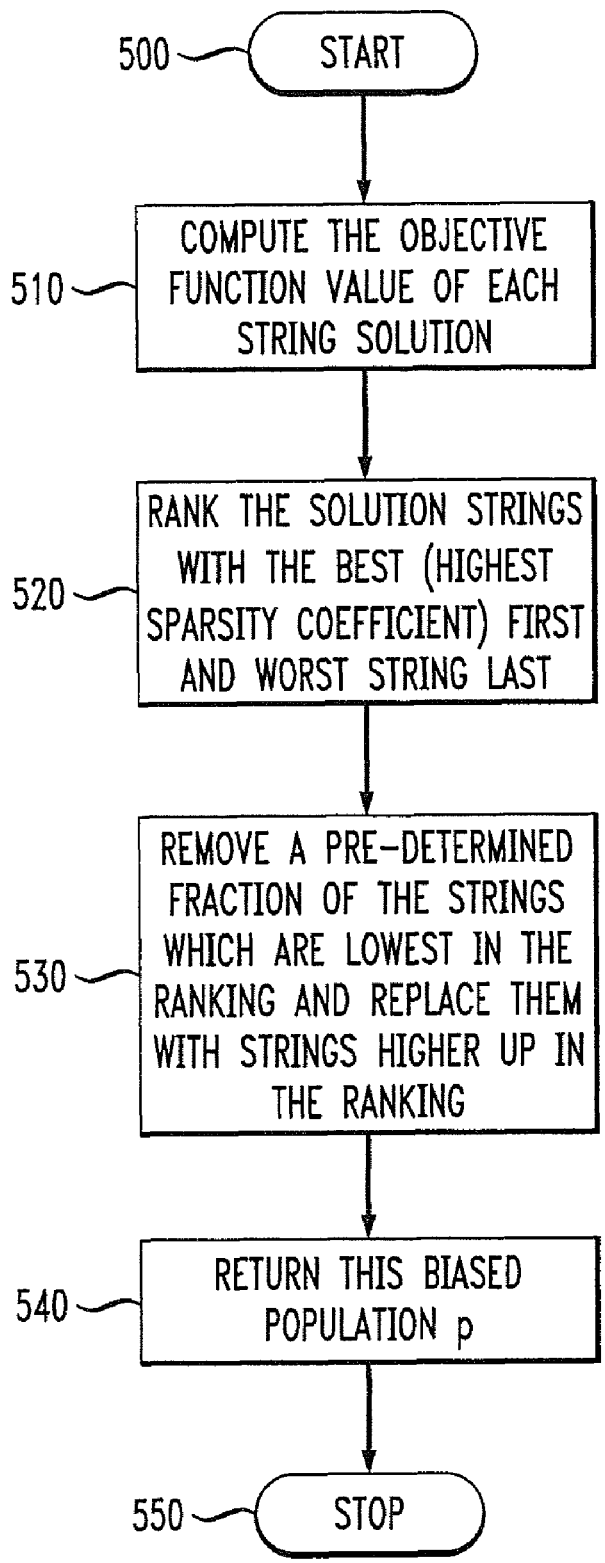
FIG. 5 is a flow diagram illustrating a procedure for selection used by a genetic outlier detection algorithm according to an embodiment of the present invention.

FIG. 5 is a flow diagram illustrating a procedure for selection used by a genetic outlier detection algorithm according to an embodiment of the present invention. This selection process corresponds to step 340 in FIG. 3. The motivation behind performing the selection process is to bias the population in order to make it contain a disproportionately high number of strings which are fit. The process starts at block 500. In step 510, the objective function value of each string solution is computed. The objective function value of a string solution is determined by the number of members of the population which cover that string. This is accomplished by using the sparsity coefficient S(D) described above. The lower this number, the more fit the string. In step 520, a ranking of the strings in the population is created, so that the fitter members (i.e., having higher sparsity coefficients) are ranked first, and the least fit members (i.e., having lower sparsity coefficients) are ranked last. The only exception is that we want the string to cover at least one record in the database. Strings which do not cover any member of the population are ranked last.

In step 530, a predetermined fraction of the strings which are lowest in the ranking are removed, and replaced with strings which are higher up in the ranking. This replacement could be done randomly. For example, a random sample could be drawn out of those strings which are higher in the ranking and could be used in order to replace the strings which are lower in the ranking. Thus, step 530 results in a population of strings which correspond to more fitter solutions. In step 540, the biased population P is returned. The process stops at block 550.

Figure 6:
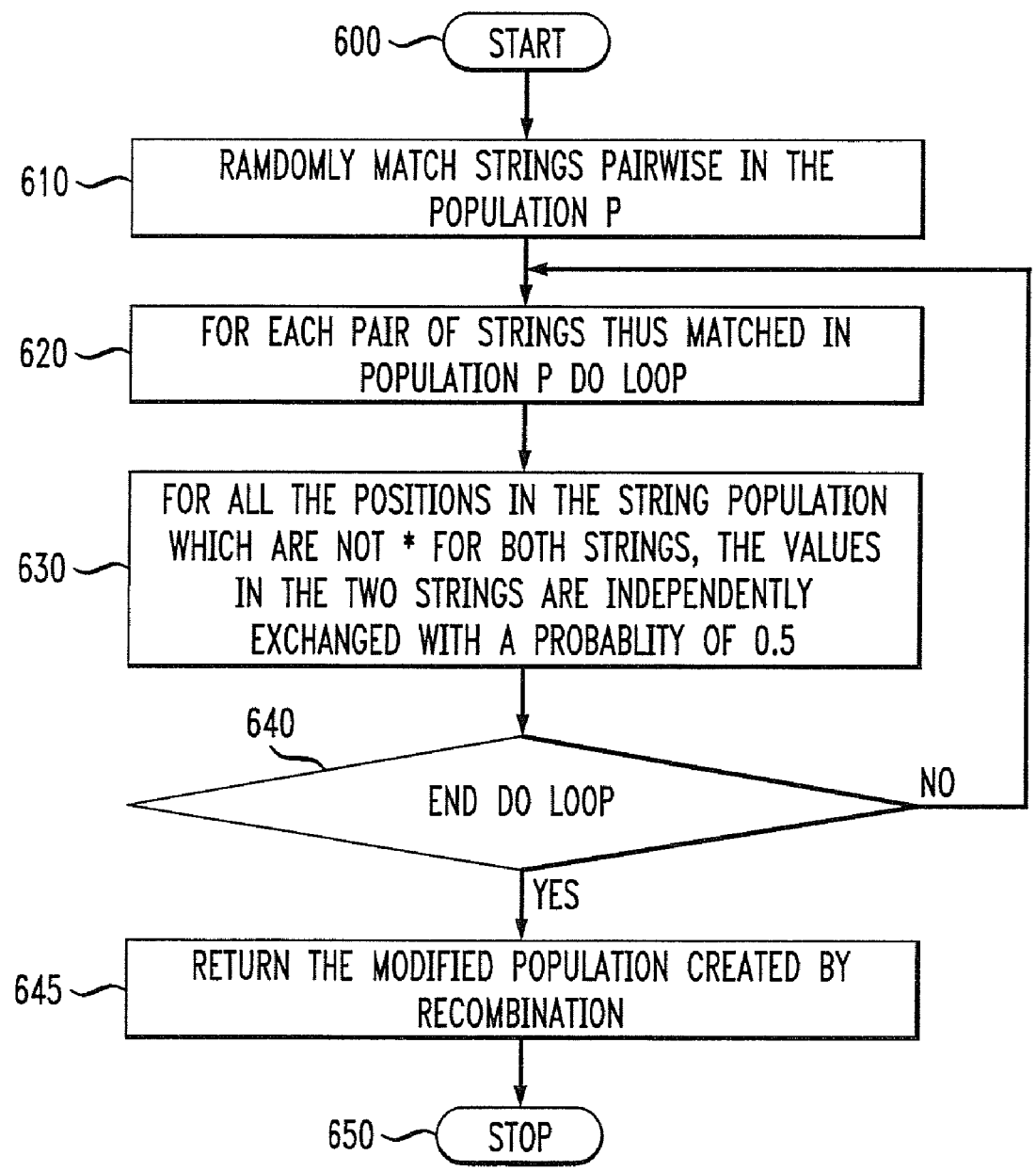
FIG. 6 is a flow diagram illustrating a procedure for crossover and solution recombination used by a genetic outlier detection algorithm according to an embodiment of the present invention.

FIG. 6 is a flow diagram illustrating a procedure for crossover and solution recombination used by a genetic outlier detection algorithm according to an embodiment of the present invention. This crossover and solution recombination process corresponds to step 350 in FIG. 3. The process starts at block 600. The input to the process is the population before crossover. In step 610, the strings are randomly matched pairwise in the population P. In steps 620 through 640, a looping structure is set up which performs the solution recombination over these pairwise assignments. In order to actually perform the recombination, the strings are iteratively looped over and, for each pair of strings, those positions in which both strings are not * are identified. For each such position, the values in the two strings are independently exchanged with a probability of 0.5. This process is performed in step 630, whereas the loop structure is implemented by the steps 620 and 640. In step 645, the updated population is reported, which is created by these recombination operations.

Figure 7:
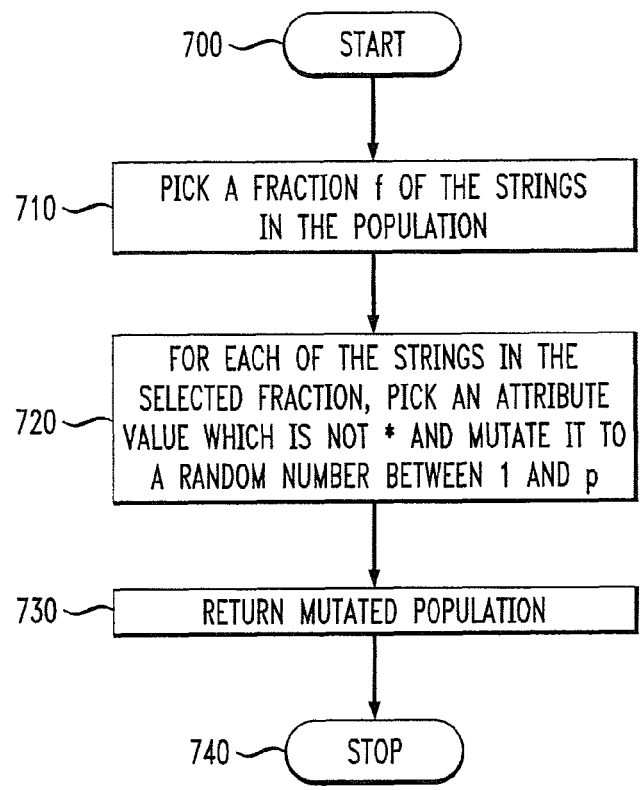
FIG. 7 is a flow diagram illustrating a procedure for mutation used by a genetic outlier detection algorithm according to an embodiment of the present invention.

FIG. 7 is a flow diagram illustrating a procedure for mutation used by a genetic outlier detection algorithm according to an embodiment of the present invention. This mutation process corresponds to step 360 in FIG. 3. The process starts at block 700. In order to perform the mutations, a fraction or probability f of the strings in the population is chosen in step 710. The value of f is a user-defined parameter. Next, in step 720, for each of the selected strings, an attribute value which is not * is selected, and mutated to a random number between 1 and p. In step 730, the set of mutated strings in the population is returned. The process ends at block 740.

Accordingly, as described above in accordance with the present invention, methods and apparatus are provided for outlier detection in databases by determining sparse low dimensional projections. These sparse projections are used for the purpose of determining which points are outliers. The methodologies of the invention are very relevant in providing a novel definition of exceptions or outliers for the high dimensional domain of data.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer implemented method of detecting one or more outliers in a data set, comprising the steps of:

determining, via computer, one or more sets of dimensions and corresponding ranges in the data set which are sparse in density; and determining, via computer, one or more data points in the data set which contain these sets of dimensions and corresponding ranges, the one or more data points being identified as the one or more outliers in the data set.

2. The method of claim 1, wherein a range is defined as a set of contiguous values on a given dimension.

3. The method of claim 1, wherein the sets of dimensions and corresponding ranges in which the data is sparse in density is quantified by a sparsity coefficient measure.

4. The method of claim 3, wherein the sparsity coefficient measure S(D) is defined as $$\frac{n(D) - N * f^k}{\sqrt{N * f^k * (1 - f^k)}},$$

where k represents the number of dimensions in the data set, f represents the fraction of data points in each range, N is the total number of data points in the data set, and n(D) is the number of data points in a set of dimensions D.

5. The method of claim 3, wherein a given sparsity coefficient measure is inversely proportional to the number of data points in a given set of dimensions and corresponding ranges.

6. The method of claim 1, wherein a set of dimensions is determined using an algorithm which uses the processes of solution recombination, selection and mutation over a population of multiple solutions.

7. The method of claim 6, wherein the process of solution recombination comprises combining characteristics of two solutions in order to create two new solutions.

8. The method of claim 6, wherein the process of mutation comprises changing a particular characteristic of a solution in order to result in a new solution.

9. The method of claim 6, wherein the process of selection comprises biasing the population in order to favor solutions which are more optimum.

10. A computer implemented method of detecting one or more outliers in a data set, comprising the steps of:
    identifying and mining, via computer, one or more patterns in the data set which have abnormally low presence not due to randomness; and
    identifying, via computer, one or more records which have the one or more patterns present in them as the one or more outliers.

11. Apparatus for detecting, via computer, one or more outliers in a data set, comprising:
    at least one processor operative to: (i) determine, via computer, one or more sets of dimensions and corresponding ranges in the data set which are sparse in density; and (ii) determine, via computer, one or more data points in the data set which contain these sets of dimensions and corresponding ranges, the one or more data points being identified as the one or more outliers in the data set.

12. The apparatus of claim 11, wherein a range is defined as a set of contiguous values on a given dimension.

13. The apparatus of claim 11, wherein the sets of dimensions and corresponding ranges in which the data is sparse in density is quantified by a sparsity coefficient measure.

14. The apparatus of claim 13, wherein the sparsity coefficient measure S(D) is defined as $$\frac{n(D) - N * f^k}{\sqrt{N * f^k * (1 - f^k)}},$$

where k represents the number of dimensions in the data set, f represents the fraction of data points in each range, N is the total number of data points in the data set, and n(D) is the number of data points in a set of dimensions D.

15. The apparatus of claim 13, wherein a given sparsity coefficient measure is inversely proportional to the number of data points in a given set of dimensions and corresponding ranges.

16. The apparatus of claim 11, wherein a set of dimensions is determined using an algorithm which uses the processes of solution recombination, selection and mutation over a population of multiple solutions.

17. The apparatus of claim 16, wherein the process of solution recombination comprises combining characteristics of two solutions in order to create two new solutions.

18. The apparatus of claim 16, wherein the process of mutation comprises changing a particular characteristic of a solution in order to result in a new solution.

19. The apparatus of claim 16, wherein the process of selection comprises biasing the population in order to favor solutions which are more optimum.

20. Apparatus for detecting, via computer, one or more outliers in a data set, comprising:
    at least one processor operative to: (i) identify and mine, via computer, one or more patterns in the data set which have abnormally low presence not due to randomness; and (ii) identify, via computer, one or more records which have the one or more patterns present in them as the one or more outliers.

21. An article of manufacture for detecting, via computer, one or more outliers in a data set, comprising a machine readable medium containing one or more programs which when executed implement the steps of:
    determining, via computer, one or more sets of dimensions and corresponding ranges in the data set which are sparse in density; and
    determining, via computer, one or more data points in the data set which contain these sets of dimensions and corresponding ranges, the one or more data points being identified as the one or more outliers in the data set.

22. The article of claim 21, wherein a range is defined as a set of contiguous values on a given dimension.

23. The article of claim 21, wherein the sets of dimensions and corresponding ranges in which the data is sparse in density is quantified by a sparsity coefficient measure.

24. The article of claim 23, wherein the sparsity coefficient measure S(D) is defined as $$\frac{n(D) - N * f^k}{\sqrt{N * f^k * (1 - f^k)}},$$

where k represents the number of dimensions in the data set, f represents the fraction of data points in each range, N is the total number of data points in the data set, and n(D) is the number of data points in a set of dimensions D.

25. The article of claim 23, wherein a given sparsity coefficient measure is inversely proportional to the number of data points in a given set of dimensions and corresponding ranges.

26. The article of claim 21, wherein a set of dimensions is determined using an algorithm which uses the processes of solution recombination, selection and mutation over a population of multiple solutions.

27. The article of claim 26, wherein the process of solution recombination comprises combining characteristics of two solutions in order to create two new solutions.

28. The article of claim 26, wherein the process of mutation comprises changing a particular characteristic of a solution in order to result in a new solution.

29. The article of claim 26, wherein the process of selection comprises biasing the population in order to favor solutions which are more optimum.

30. An article of manufacture for detecting, via computer, one or more outliers in a data set, comprising a machine readable medium containing one or more programs which when executed implement the steps of:

identifying and mining, via computer, one or more patterns in the data set which have abnormally low presence not due to randomness; and identifying, via computer, one or more records which have the one or more patterns present in them as the one or more outliers.

\* \* \* \* \*